(12) United States Patent
Saieg et al.

(10) Patent No.: US 7,097,192 B2
(45) Date of Patent: Aug. 29, 2006

(54) TRAILER SLIDER LOCKING PIN INTERLOCK WITH PARKING BRAKE

(75) Inventors: Steven G. Saieg, Sterling Heights, MI (US); LaVerne A. Caron, Kalamazoo, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 339 days.

(21) Appl. No.: 10/664,138

(22) Filed: Sep. 17, 2003

(65) Prior Publication Data
US 2005/0056477 A1   Mar. 17, 2005

(51) Int. Cl.
*B62D 53/06* (2006.01)
(52) U.S. Cl. ............... 280/407.1; 280/149.2; 180/209; 303/89
(58) Field of Classification Search ............ 280/407.1, 280/149.2; 180/209; 303/7, 3, 89
See application file for complete search history.

(56) References Cited

U.S. PATENT DOCUMENTS

| | | | | |
|---|---|---|---|---|
| 3,177,002 A | * | 4/1965 | Schmidt | .................... 280/81.1 |
| 4,273,347 A | | 6/1981 | Hulse | |
| 4,286,797 A | * | 9/1981 | Mekosh et al. | .......... 280/149.2 |
| 4,641,846 A | | 2/1987 | Ehrhart | |
| 5,137,296 A | * | 8/1992 | Forman | .................... 280/407.1 |
| 5,199,732 A | | 4/1993 | Lands et al. | |
| 5,314,201 A | | 5/1994 | Wessels | |
| 5,465,990 A | | 11/1995 | Wessels | |
| 5,476,277 A | | 12/1995 | Schueman | |
| 5,531,467 A | | 7/1996 | Schueman | |
| 6,384,716 B1 | | 5/2002 | Eckelberry | |

FOREIGN PATENT DOCUMENTS

| | | |
|---|---|---|
| GB | 424218 | 2/1935 |
| GB | 907927 | 10/1962 |
| WO | WO 00/43255 | 7/2000 |

* cited by examiner

*Primary Examiner*—Ruth Ilan
(74) *Attorney, Agent, or Firm*—Carlson, Gaskey & Olds

(57) ABSTRACT

A slider locking pin control receives feedback of the actual position of the locking pins. If the locking pins are not engaged in the trailer frame rails, then the interlock valve will vent air to release a parking brake. Once the locking pins are engaged, the interlock valve will allow the flow of air to release the parking brakes. If the vehicle operator attempts to move the vehicle, but the locking pins are not engaged, the operator will be unable to release the parking brakes. This will prevent movement of the trailer until the locking pins are engaged. The interlock valve is placed downstream of a spring brake control valve and pressurized air reservoir, such that the pressurized air reservoir can still receive pressurized air to charge, and provide air for use by various components on the trailer.

11 Claims, 5 Drawing Sheets

TRAILER SLIDER LOCKING PIN INTERLOCK WITH PARKING BRAKE

BACKGROUND OF THE INVENTION

This application relates to a trailer slider failsafe mechanism for ensuring the slider locking pins are properly engaged prior to the release of the parking brakes.

Heavy combination vehicles include a tractor and one or more trailers. As known, trailers often incorporate a slider, which includes a pair of axles, the suspension and an apparatus for adjusting and locking the position of the slider along the length of the trailer. Typically, a linkage is actuated and locking pins are moved to engage selected holes in the frame rails of the trailer. With the locking pins removed from the holes, the slider position may be adjusted along the length of the frame rails. Once the slider reaches a new desired position, the actuation element is operated and the locking pins are moved into the holes in the trailer frame.

One challenge with the use of a slider, is to ensure the locking pins are engaged in the holes before the tractor begins to pull the trailer. If the locking pins are not fully engaged, then it is possible for the slider to move relative to the trailer, such as under hard braking or high acceleration. This would be undesirable.

Various proposals have been made in the prior art for systems that interlock the parking brake to the locking pin position. In these systems, if the locking pins are not engaged, then a valve will be in a position preventing flow of pressurized air to the parking brake control valve. As is known, vehicle parking brakes typically include a large spring that moves to set the brake, preventing movement of the trailer. With the parking brakes set, the trailer cannot move. Thus, these prior art systems are intended to prevent the trailer from moving unless the locking pins are engaged.

Trailers are equipped with an air supply line that is used to charge the trailer air reservoir and to retract the parking brakes. For modern North American trailers, a parking brake control valve is provided that usually directs air preferentially to the parking brakes and then to the reservoir. This valve also prevents loss of reservoir pressure if the supply line is disconnected. The reservoir supplies pressurized air to operate the service brakes and is also used for various other applications on the trailer. The prior art has proposed that the pin interlock valve should vent the supply line coming from the tractor and block any flow at the inlet to the parking brake control valve. Thus, in these prior art proposals, when the interlock valve vents the supply of pressurized air, the reservoir will not charge.

Moreover, in many modern systems, blocking the inlet to the parking brake control valve may actually lock the parking brakes in a release position if they are already released prior to the locking pins moving out of engagement. That is, if the parking brakes are released, and for whatever reason the pins are then withdrawn, the parking brakes cannot be set, and would stay in the release position. That is, with the valve in the prior art position, when the valve opens to vent the flow of air from the pressurized air supply line, it would block the line leading to the parking brake control valve. This could potentially lock the air already in the parking brake chamber, holding the brake away from its parked position.

Another problem with this prior art, is that if the reservoir is not charged and the supply line is vented, there may not be air to drive accessories. Many of the locking pin drives are pneumatically powered. In the absence of pressurized air in the reservoir, these systems would not be able to move the locking pins.

SUMMARY OF THE INVENTION

In the disclosed embodiment of this invention, a feedback member is incorporated along a drive transmission between the actuation element and the locking pins. The feedback member is in an expected position when the locking pins are engaged in the holes. If the feedback member is not at that known position, then one or more of the spring brakes is vented and the source of air from the spring brake control valve is blocked.

As known, trailer parking brakes typically include a heavy spring that sets the parking brake when the vehicle is parked for any period of time. The parking brake prevents the trailer from moving. When it is desired to begin to move the trailer again, pressurized air is introduced in opposition to the heavy spring, moving the heavy spring away from the "park" position. Once the parking brake has been released in this fashion, the trailer can again move.

The feedback member controls an interlock valve that is positioned downstream of the spring brake control valve, and on the supply line for supplying pressurized air to the parking brakes.

The present invention provides failsafe operation by controlling the flow of air to the parking brakes. Should the feedback member not be in the expected "engaged" position, pressurized air will be blocked from flowing to the parking brakes, and the heavy spring will not be released. Also, the pressurized air in the parking brakes will be vented to atmosphere. In this manner, air is still delivered to charge the reservoir. Moreover, should the parking brakes have been released when the pins move out of the engaged position, the parking brake will be immediately set.

Some warning, signal, etc., may also be sent to the operator such that he has an understanding of why the parking brakes are not released.

These and other features of the present invention can be best understood from the following specification and drawings, the following of which is a brief description.

DETAILED DESCRIPTION OF THE PREFERRED EMBODIMENT

Figure 1:
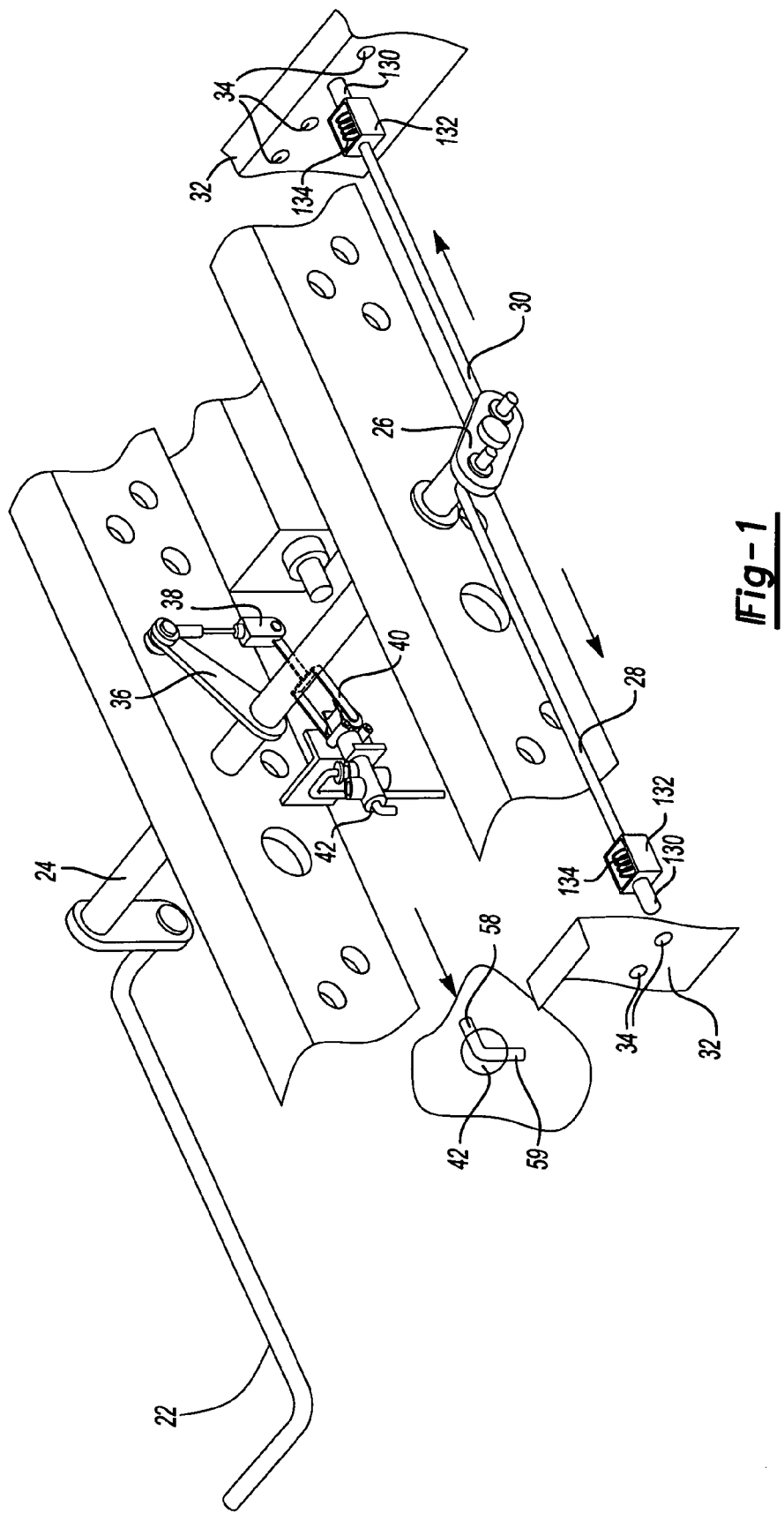
FIG. 1 is a view of the operative portions of the present invention.

FIG. 1 shows a slider having an actuation element 22 for driving a torque tube 24. As is known, the torque tube 24 causes a bracket 26 to pivot. Bracket 26 pivots to change the position of a pair of links 28 and 30. Locking pins 130 are attached to links 28 and 30 and extend into frame rails 32 at each side of a trailer frame. As shown, there are a plurality of incrementally spaced holes 34 along the length of the frame rails 32. The locking pins 130 engage in a selected set of these holes to lock the slider to the frame rails 32 at a selected position. The locking pin may be mounted at 132 with a spring bias 134. This structure is as known, and is shown in a somewhat simplified manner in FIG. 1.

As also shown, a feedback member 36, shown as a lever, rotates with the torque tube 24. The feedback member 36 in turn causes a transmission member 38 to move upwardly and downwardly as torque tube 24 rotates. The member 38 causes a valve member 40 to pivot between a first position (FIG. 1) at which it allows flow of air through a parking brake interlock valve 42, and to a second position (FIG. 2) at which it dumps the pressurized air in the parking brakes to atmosphere.

Figure 2:
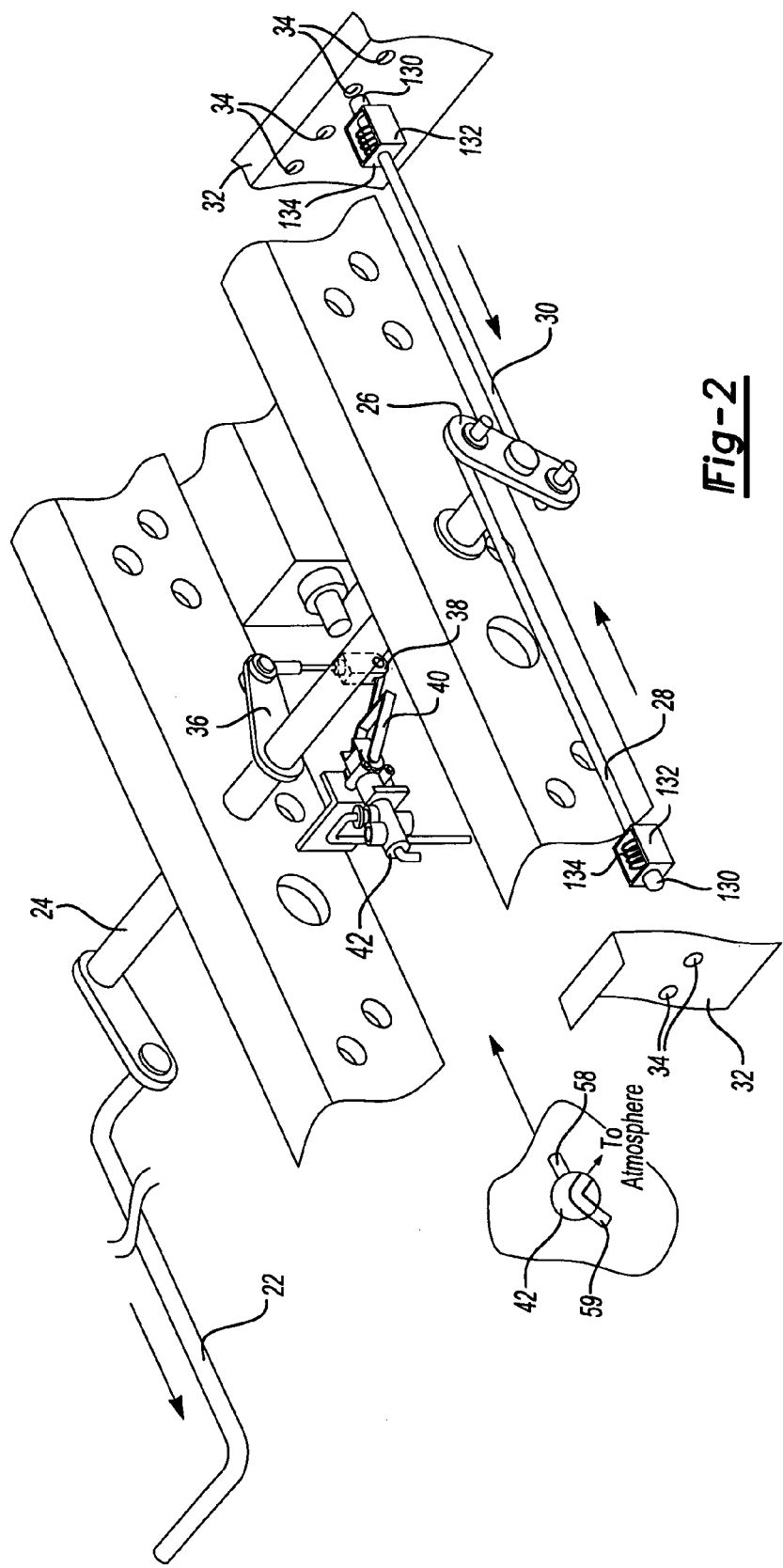
FIG. 2 shows the locking pins in a non-engaged position.

As shown in FIG. 2, the actuation element 22 has now been pulled, and the feedback member 36 is in a distinct position. The locking pins 130 are not engaged in a hole 34. At this position, the valve 42 blocks flow of pressurized air to the parking brakes, instead venting air in the line 59 to the parking brakes to atmosphere.

The structure of the valve 42 is as known and its detail forms no part of this invention. In fact, the valve may be a known height control valve that is typically utilized in combination with the vehicle suspension member to selectively block or allow flow to the air springs. Simply, the valve only need be a two-position valve having appropriate flow passages to allow air to flow to the parking brakes, or to block and vent that air flow depending on whether the feedback member 36 is in the FIG. 1 or FIG. 2 position. Of course, other valve controls could be utilized to achieve the interlock between the locking pin position and the parking brake. As an example, the torque tube may directly pivot a member to control valve position, rather than having the intermediate mechanical linkage.

Figure 3A:
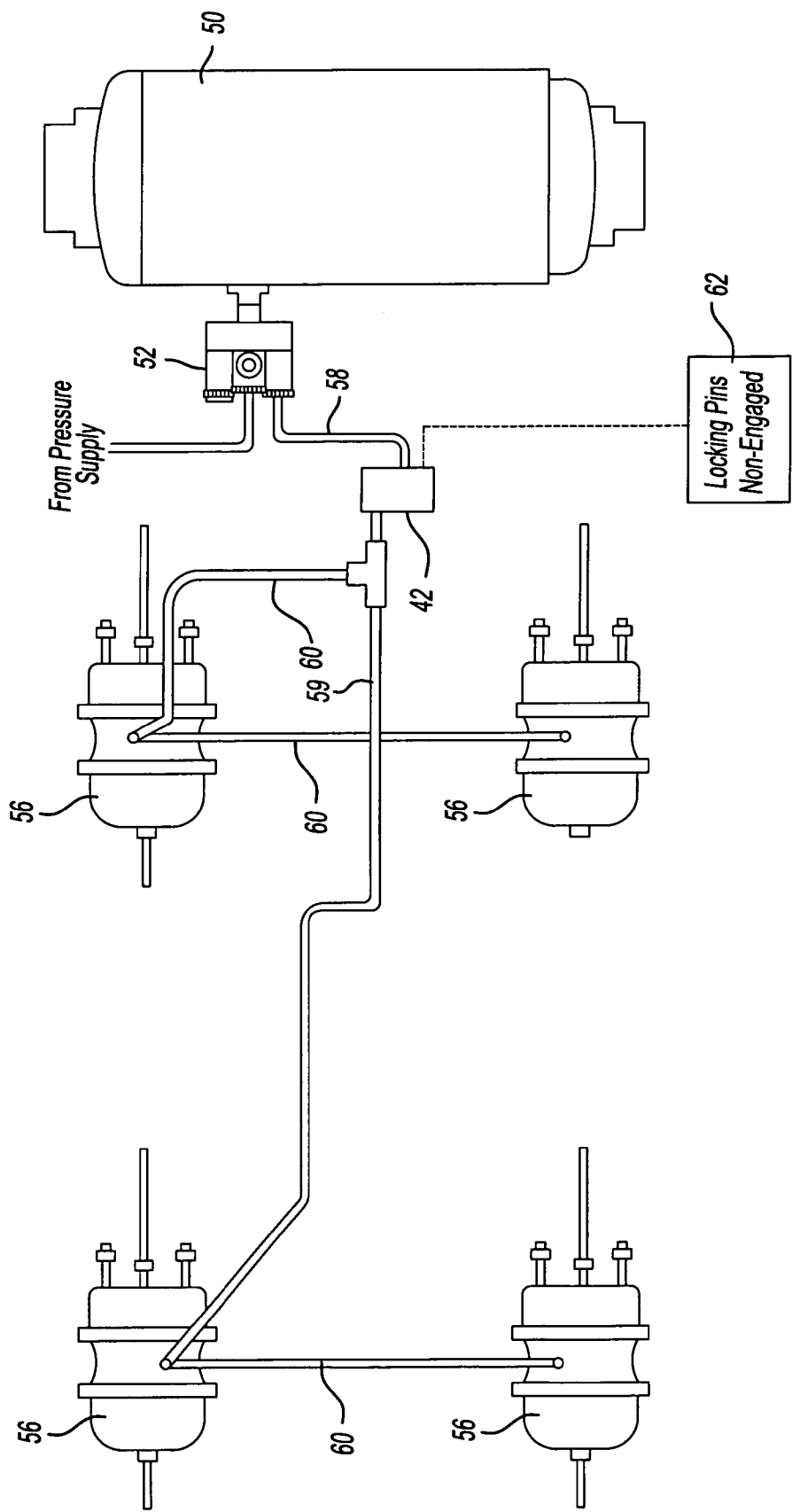
FIG. 3A is a schematic representation of the present invention.

FIG. 3A, a schematic for the invention, shows a parking brake control valve 52 selectively communicating air to the parking brake supply line 58 and the air reservoir 50. A parking brake is, as mentioned above, also known as a spring brake and is utilized for heavy trailers. A number of parking brakes 56 are mounted on the axles. When an operator sends a signal to release the parking brakes 56, valve 52 communicates pressurized air through lines 58, 59, 60 to the parking brakes 56. As explained previously, this pressurized air will cause the heavy spring to move away from the brake or park position, as known.

Figure 3B:
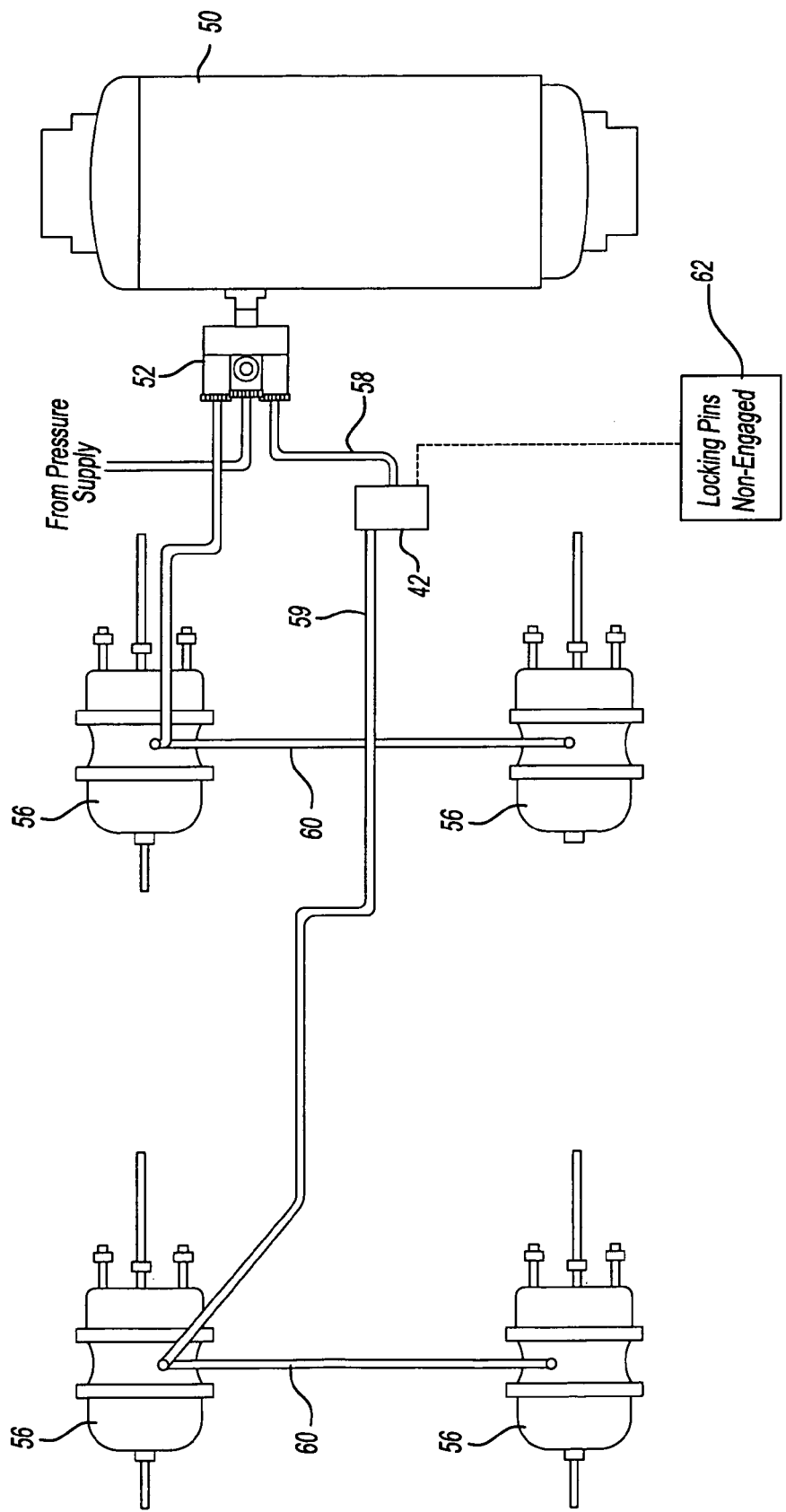
FIG. 3B shows another embodiment.
Figure 4:
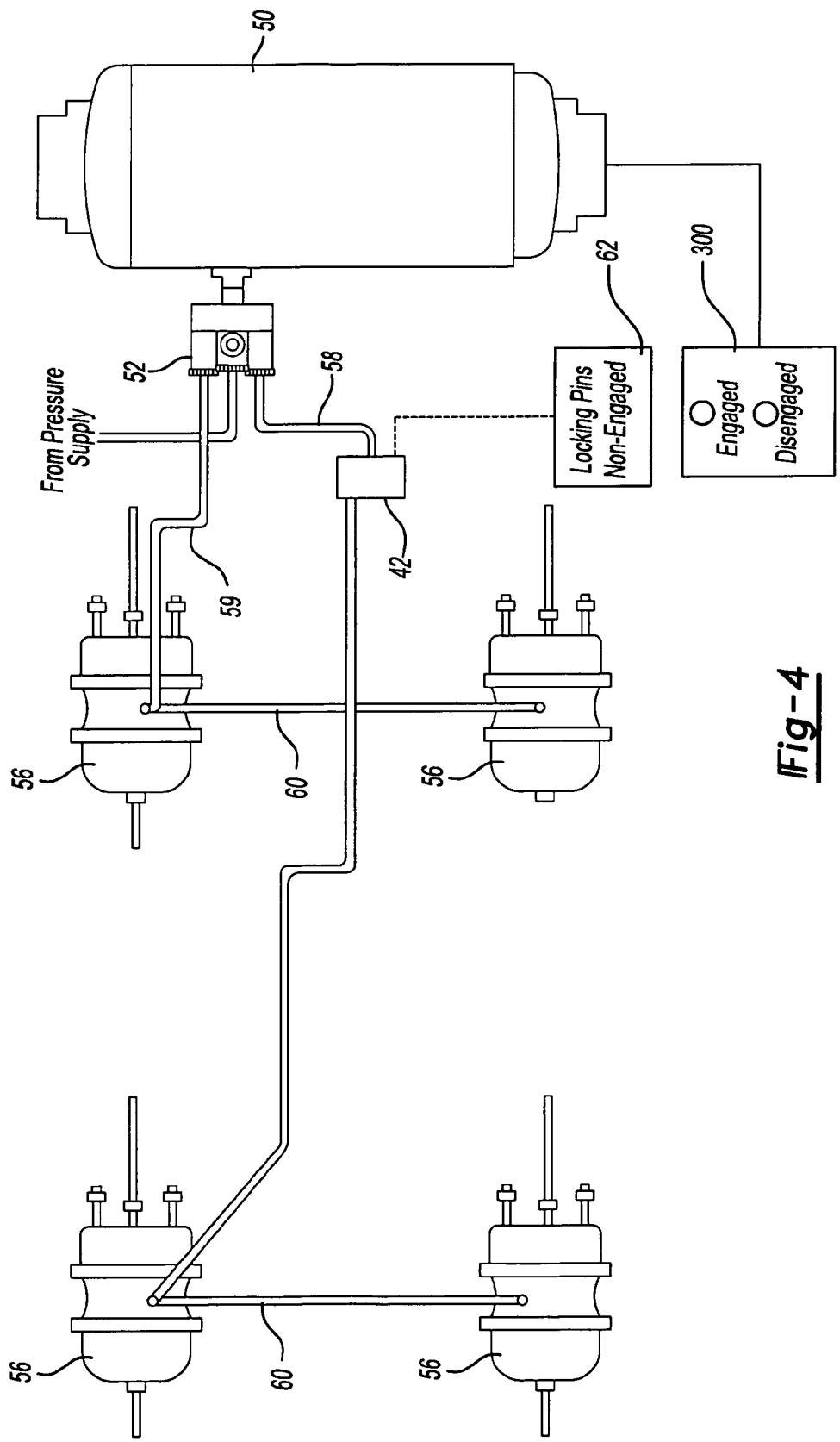
FIG. 4 shows yet another embodiment.

The parking brake control valve 52 typically supplies either to the line 58 leading to the parking brakes 56, or to the reservoir 50. In varying types of parking brake control valves 52, there could be parking brake priority or service brake priority valves. The FIGS. 3A, 3B and 4 are an over-simplification, and eliminate the entire service brake plumbing. However, for purposes of understanding this invention, it is sufficient to understand that the parking brake control valve 52 will selectively deliver the pressurized air either to the line 58 or to the reservoir 50. Since the valve 42 is downstream of this valve 52, the reservoir 50 can be charged.

The present invention incorporates the valve 42 along this pressurized air flow line 59. It should be understood that valves 42 and 52 could be combined as a single valve. Now, if the locking pins are is in the position shown in FIG. 1, then the valve 42 will allow the flow of pressurized air through the line 58 to line 59 and to the parking brakes 56. However, if the locking pins are not in the FIG. 1 engaged position, the valve 42 will block the flow of air between the lines 58 and 59, and instead dump pressurized air in the parking brakes 56 to atmosphere. As can be appreciated, the valve 42 is positioned downstream of the reservoir 50. Now, if the valve 42 is in the FIG. 2 position, air is still delivered to the reservoir and the reservoir can remain charged. Thus, the problem mentioned above of the reservoir not being charged when the interlock valve is open is avoided. Moreover, since the parking brakes are themselves vented by the valve, the other problem mentioned above of the parking brake already being released when the locking pins move to the non-engaged position is also avoided.

As shown in FIG. 3B, valve 42 could be connected to only a pair of the parking brakes 56. That is, for the interlock, all that is necessary is one or more of the parking brakes be set. The configuration shown in FIG. 3B thus would provide the same interlock by actuating a fewer number of parking brakes.

FIG. 4 shows yet another embodiment wherein the link or actuation member 22 is replaced by a pneumatic actuation element with a pneumatic control 300. Pneumatic control 300 includes a push button selector to engage or disengage the locking pins. The prior art discloses various ways for utilizing a pneumatic-powered actuation element for driving the pins. The structure could be as simple as a mechanical linkage that will cause the torque tube 24 to pivot should the pneumatic control 300 be actuated. The pneumatic control 300 is often simply a push button valve that selectively delivers a pressurized air flow to an appropriate mechanical linkage. In the prior art, such a control might not have been provided with actuation air, since the pressurized air leading to the control 300 would come from the reservoir. The present invention thus also provides pneumatic air flow to allow actuation of the locking pins.

In all embodiments, the parking brakes will not be released, unless the locking pins are engaged. As also shown somewhat schematically, a warning signal 62 may be provided to the operator in the vehicle cab indicating the reason why the parking brakes are not released. The vehicle operator will then know to return to the trailer, and ensure that the locking pins are engaged. As can be also understood from these schematic figures, should the parking brakes be charged, and the valve 42 then opened, the parking brakes will have their pressurized air flow vented to atmosphere, and they will move back to the park position.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A trailer slider comprising:

an actuation member for changing a position of a pair of locking pins, and driving the pair of locking pins between a non-engaged and an engaged position;

a feedback member moving with said actuation member, said feedback member being in an expected position in said engaged position of said pair of locking pins; and said feedback member communicating a position of said pair of locking pins to an interlock valve, said interlock valve ensuring a parking brake associated with a trailer carrying the trailer slider is in a park position if said feedback member does not communicate that said pair of locking pins are in said expected position; and the trailer also being provided with a parking brake control valve and a compressed air reservoir, said interlock valve being positioned on a pressurized air supply line downstream of said parking brake control valve and said compressed air reservoir; and wherein said interlock valve connects said compressed air reservoir to atmosphere if said feedback member is not in said expected position.

2. The trailer slider as set forth in claim 1, wherein said actuation member drives a torque tube which is turned to move said pair of locking pins between said non-engaged and said engaged positions.

3. A trailer slider comprising:
   an actuation member for changing a position of a pair of locking pins, and driving the pair of locking pins between a non-engaged and an engaged position;
   a feedback member moving with said actuation member, said feedback member being in an expected position in said engaged position of said pair of locking pins; and
   said feedback member communicating a position of said pair of locking pins to an interlock valve, said interlock valve ensuring a parking brake associated with a trailer carrying the trailer slider is in a park position if said feedback member does not communicate that said pair of locking pins are in said expected position; and
      the trailer also being provided with a parking brake control valve and a compressed air reservoir, said interlock valve being positioned on a pressurized air supply line downstream of said parking brake control valve and said compressed air reservoir; and
   wherein said actuation member drives a torgue tube which is turned to move said pair of locking pins between said non-engaged and said engaged positions; and
   wherein said feedback member is a lever that rotates with said torque tube, said lever in turn moving a transmission member, said transmission member driving said interlock valve between a flow blocking position and a flow position, said interlock valve venting pressurized air from said parking brake in said flow blocking position.

4. The trailer slider as set forth in claim 1, wherein said actuation member is a pneumatic control.

5. The trailer slider as set forth in claim 1, wherein said actuation member is a mechanical element.

6. The trailer Aslider as set forth in claim 1, wherein a warning is sent to a vehicle operator when said interlock valve is ensuring the parking brake is in the park position.

7. The trailer slider as set forth in claim 1, wherein said parking brake control valve is positioned to receive pressurized air from said pressurized air supply line, and to deliver pressurized air to said compressed air reservoir, or to said parking brakes, and through said interlock valve.

8. A vehicle trailer system comprising:
   at least one parking brake, said at least one parking brake being moved between a park and release position by a flow of pressurized air;
   a vehicle slider having at least a pair of locking pins, said pair of locking pins being movable by an actuation member between engaged and non-engaged positions;
   a trailer frame rail comprising a plurality of incrementally spaced holes, said pair of locking pins moved into selected ones of said holes in said engaged position;
   an interlock valve being movable between a flow blocking position when said pair of locking pins are in said non-engaged position, and a flow position when said pair of locking pins are in said engaged position, said flow blocking position preventing the flow of pressurized air to said at least one parking brake and preventing release of said at least one parking brake if said pair of locking pins are not in said engaged position; and
   the vehicle trailer system further carrying an air reservoir and a pressurized air supply line communicating to said air reservoir, said interlock valve being positioned in an air supply line leading to said at least one parking brake, and downstream of said air reservoir; and
   wherein said interlock valve connects said air reservoir to atmosphere if said pair of locking pins are not in said engaged position.

9. The vehicle trailer system as set forth in claim 8, wherein said pair of locking pins are movable under pneumatic control.

10. The vehicle trailer system as set forth in claim 8, wherein said pair of locking pins are movable under control of a mechanical actuation element.

11. The vehicle trailer system as set forth in claim 8, wherein a parking brake control valve is positioncd between said interlock valve and said air reservoir, said parking brake control valve also communicating with said pressurized air supply line, said parking brake control valve selectively communicating pressurized air to said at least one parking brake, or to said air reservoir, and said interlock valve being positioned on a line communicating said parking brake control valve to said at least one parking brake.

* * * * *

UNITED STATES PATENT AND TRADEMARK OFFICE
CERTIFICATE OF CORRECTION

PATENT NO. : 7,097,192 B2
APPLICATION NO. : 10/664138
DATED : August 29, 2006
INVENTOR(S) : Saieg et al.

It is certified that error appears in the above-identified patent and that said Letters Patent is hereby corrected as shown below:

Column 5, line 23: "torgue" should be --torque--

Column 5, line 37: "Aslider" should be --slider--

Column 5, line 44: "brakes" should be --brake--

Column 6, line 35: "positioncd" should be --positioned--

Signed and Sealed this

Fifth Day of December, 2006

JON W. DUDAS
*Director of the United States Patent and Trademark Office*